Patented Nov. 29, 1938

2,138,214

UNITED STATES PATENT OFFICE 2,138,214

PROCESS FOR THE PRODUCTION OF PRECIPITATED SULPHUR

William H. Shiffler and Philip S. Danner, Berkeley, Calif., assignors to Standard Oil Company of California, San Francisco, Calif., a corporation of Delaware No Drawing. Application July 8, 1935,
Serial No. 30,352

1 Claim. (Cl. 23—224)

This invention relates to a process for the production of precipitated or so-called "flotation" sulphur and more particularly to a process for converting lump sulphur into flotation sulphur suitable for parasiticidal use.

The value of elementary sulphur in controlling various fungus growths and insect infestations of horticultural and agricultural crops has long been recognized. Sulphur in two forms of fine subdivision, ground and sublimed, has been available for this use. Neither such form is, however, ideally suited to such service and hence a search for a better product has been widespread. This search has revealed that sulphur precipitated from aqueous solutions of appropriate sulphur compounds is generally superior in every respect to sulphur in either of the previously employed forms.

Sulphur in this newer and more satisfactory form, recovered as a by-product of the purification of city gas, has been available in certain limited localities and has been carefully investigated for parasiticidal use. The difficulties encountered in attempting to remove the considerable quantity of impurities usually associated with this product have, however, retarded its adoption for such use even in localities where it is readily available.

Several processes have been proposed and used on a small scale to produce flotation sulphur as the primary product but they have as a rule been so unsatisfactory and so uneconomical as to preclude wide adoption.

In an application, Serial No. 30,353 copending herewith we have disclosed and claimed a process whereby it is possible to produce substantially pure hydrogen sulphide from impure sulphur containing gases and particularly from the gases associated with or derived from petroleum. In a second copending application, Serial No. 30,354, we have disclosed a fundamental group of chemical reactions whereby it is possible to produce pure hydrogen sulphide. In one phase of that development a highly satisfactory precipitated or flotation sulphur is produced. An extension and adaptation of the ideas and reactions involved in these two applications constitutes the subject of this invention.

It is the object of the present invention to provide an unlimited supply of flotation sulphur of satisfactory purity for parasiticidal use.

It is a further object of the invention to provide pure flotation sulphur substantially without regard to the location of a source of the raw material from which it is produced.

It is a still further object of the invention to provide a process whereby ordinary elementary sulphur as mined and as widely distributed may be economically and simply transformed into flotation sulphur independently of any other process or product.

In our second above-mentioned copending application we have disclosed the equilibrium constant:

$$K = \frac{(\overline{SH})^2}{(\overline{S_5})(H_2S)}$$

for the reaction:

$$\overline{S_5} + H_2S = 2(\overline{SH}) + 4S$$

We have now found that this general reaction may advantageously be applied to the conversion of any available commercial form of elementary sulphur into precipitated or flotation sulphur for parasiticidal use. For the sake of economy we have employed the calcium compounds of the ions involved in this equation though obviously any metal of which the pentasulphide and the hydrosulphide are even moderately soluble in water would serve equally well.

Lump sulphur is rapidly taken up by calcium hydrosulphide solutions at slightly elevated temperatures, for instance 150°–190° F., with the formation of calcium polysulphides and the liberation of hydrogen sulphide gas. When the polysulphide solution so formed is cooled, for instance to 60°–100° F., and then intimately contacted with hydrogen sulphide the gas is rapidly absorbed with the precipitation of elementary sulphur in a state of fine subdivision. This is typical flotation sulphur of high purity.

Obviously if the hydrogen sulphide liberated in the foregoing first step is collected and stored it may be employed in the second step and hence the cycle be completed with the net result the transformation of lump sulphur of any convenient size and shape into a precipitated or flotation sulphur which is admirably suited for application either as an aqueous suspension or as a dry powder or "dust" in parasite control work.

This transformation may be represented chemically by the following simple addition:

I. 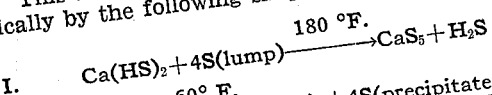

II. 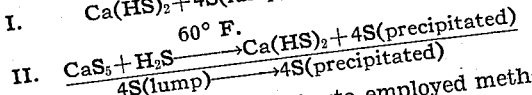

As compared to the hitherto employed method of grinding or subliming lump sulphur for the production of a useful parasiticide our simple solution and reprecipitation method possesses many obvious advantages. It is considerably cheaper results in a product which is inherently better adapted to the intended use and may in certain instances effect a worth while incidental purification making possible the utilization of a low grade of natural sulphur thereby materially reducing the overall cost of the finished product Various modifications of the simple two step process just outlined will now be readily apparent. For instance continuous operation can be effected by carrying out the two reactions substantially simultaneously in different units of the same system, the hydrogen sulphide liberated in the first step being led directly to the second step. In addition to the economies inherent in continuous operation such procedure would in the present case eliminate the necessity of providing storage facilities for hydrogen sulphide between steps and would at the same time eliminate the hazard of accumulating any considerable quantity of that highly toxic gas.

As will be obvious to one skilled in the art several types of filters are available for removing the precipitated sulphur from the suspension produced in the second step before the solution is returned to the first step. A filter of the continuous type will in most instances be desirable though in other cases where it may be necessary to wash the last traces of hydrosulphide solution from the sulphur a suitable form of intermittent operation may be preferable.

When pure hydrogen sulphide is available from a source other than that just described, as for instance from the process of our first above mentioned application, it may be desirable to produce a certain amount of calcium pentasulphide in the same cycle of reactions in which precipitated sulphur is being produced. In such case Reaction I given above could be modified as follows:

III. $Ca(HS)_2 + Ca(OH)_2 + 8S(lump) \rightarrow 2CaS_5 + 2H_2O$

Half of the $CaS_5$ produced would be withdrawn from the cycle for sale or other use and the $H_2S$ for Reaction II would 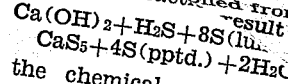 able external source.

be indicated by the reac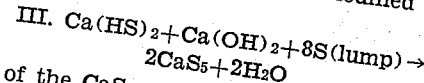lied from the available result would then $Ca(OH)_2 + H_2S + 8S(lu.$
$CaS_5 + 4S(pptd.) + 2H_2O$ which is the chemical sum of Rea... and III.

Still other modifications in materials bala... will be obvious and may be adopted to meet specific requirements of operation and/or demand without departing from the spirit or scope of this invention.

Having now described a novel and highly efficient process for converting any available form of bulk or mass sulphur into uniform, finely divided, flotation or precipitated sulphur for parasiticidal and other uses, and an alternative process which at the same time produces lime-sulphur solution, what we claim is:

A process for continuously producing in the same cycle of operations, sulphur in a state of purity and fine subdivision adapted to application as a dust or aqueous suspension to horticultural crops and lime sulphur of a purity suitable for horticultural use, said cycle comprising the steps of reacting calcium hydrosulphide solution with lump sulphur and hydrated lime at a temperature of substantially 150° to 190° F., of removing a portion of the pentasulphide solution produced and of reacting the remainder with hydrogen sulphide at a temperature of 60°–100° F. whereby elementary sulphur is precipitated, of separating said sulphur and recycling the solution for reaction with further lump sulphur and hydrated lime.

WILLIAM H. SHIFFLER.
PHILIP S. DANNER.